(12) United States Patent
Yonekawa et al.

(10) Patent No.: US 7,274,033 B2
(45) Date of Patent: Sep. 25, 2007

(54) READING METHOD FOR RADIATION IMAGE INFORMATION AND RADIATION IMAGE READING APPARATUS

(75) Inventors: Hisashi Yonekawa, Hachioji (JP); Masakazu Andou, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/298,841

(22) Filed: Dec. 12, 2005

(65) Prior Publication Data

US 2006/0124875 A1 Jun. 15, 2006

(30) Foreign Application Priority Data

Dec. 15, 2004 (JP) ............................. 2004-362827

(51) Int. Cl.
G01N 21/85 (2006.01)
A61B 6/00 (2006.01)

(52) U.S. Cl. ....................... 250/580; 250/581; 250/582; 378/51

(58) Field of Classification Search ................. 250/590, 250/582

See application file for complete search history.

(56) References Cited

U.S. PATENT DOCUMENTS

| | | | | |
|---|---|---|---|---|
| 4,482,233 A | * | 11/1984 | Bauer et al. ................. | 396/598 |
| 5,340,995 A | * | 8/1994 | Verbeke et al. ............. | 250/581 |
| 6,781,144 B2 | * | 8/2004 | Yonekawa ................... | 250/589 |
| 6,940,078 B2 | * | 9/2005 | Yasuda et al. ............ | 250/484.4 |
| 7,057,188 B2 | * | 6/2006 | Struye et al. ............ | 250/484.4 |
| 7,122,807 B2 | * | 10/2006 | Andou et al. ............ | 250/484.4 |

FOREIGN PATENT DOCUMENTS

| | | | | |
|---|---|---|---|---|
| JP | 60-165643 | A | * | 8/1985 |
| JP | 64-35431 | A | | 2/1989 |
| JP | 11-160820 | A | | 6/1999 |
| JP | 2002-107852 | A | | 4/2002 |
| JP | 2002-148741 | A | | 5/2002 |

(Continued)

OTHER PUBLICATIONS

Dorland's Illustrated Medical Dictionary, 2003.*

*Primary Examiner*—Patrick Assouad
*Assistant Examiner*—Yara B Green
(74) *Attorney, Agent, or Firm*—Finnegan, Henderson, Farabow, Garrett & Dunner, L.L.P.

(57) ABSTRACT

A method for reading radiation image information in which a cassette is lowered while keeping each short side of the cassette extending vertically, and then inserted into a radiation image reading apparatus which has a cassette loading inlet in its upper surface and the inserted cassette is taken into the apparatus, and next the front base and the back base are disengaged in the apparatus and both are separated, and after the radiation image information is read from the stimulable phosphor sheet of the back base which are separated from the front base, and then the front base and the back base are joined and ejected from the insertion opening of the apparatus. The apparatus height is smaller than in the method in which the stimulable phosphor sheet is pulled downward from the cassette and is read, and the operation of lifting the cassette against the force of gravity up to the height of the upper surface of the apparatus becomes unnecessary at the time of inserting the cassette.

9 Claims, 13 Drawing Sheets

FOREIGN PATENT DOCUMENTS

| | | |
|---|---|---|
| JP | 2002-156716 A | 5/2002 |
| JP | 2003-255096 A | 9/2003 |
| JP | 2003-287832 A | 10/2003 |
| JP | 2004-109252 A | 4/2004 |
| JP | 2004-212793 A | 7/2004 |
| JP | 2004-239713 A | 8/2004 |

* cited by examiner

READING METHOD FOR RADIATION IMAGE INFORMATION AND RADIATION IMAGE READING APPARATUS

This application is based on Japanese Patent Application No. 2004-362827 filed on Dec. 15, 2004 in Japanese Patent Office, the entire content of which is hereby incorporated by reference.

BACKGROUND OF THE INVENTION

This invention relates to a reading method for reading radiation image information stored on a stimulable phosphor sheet and to a radiation image reading apparatus.

Many radiation image reading apparatuses are used in which image information is outputted as digital data in order to store and transmit radiation image information generated at hospitals. A radiation image reading apparatus in which a stimulable phosphor sheet is used, is a well known example of the radiation image reading apparatus which outputs this type of digital data.

The stimulable phosphor sheet is one in which a thin layer of a stimulable phosphor is formed on a support material and covered with a protective layer. The stimulable phosphor accumulates radiation energy such as the irradiated X-rays and the like, and also releases the accumulated energy as photo-stimulated luminescence by being irradiated with excitation light of a prescribed wavelength.

When the stimulable phosphor sheet is used in X-ray radiography, the radiation energy which has passed through an object can be accumulated in the stimulable phosphor sheet. Photo-stimulated luminescence can be taken out by subsequently irradiating the stimulable phosphor sheet with excitation light and then the radiation energy is taken out as an electric signal by a photoelectric conversion element such as a photomultiplier.

As described in Patent Document 1, the stimulable phosphor sheet may be the coated type in which a stimulable phosphor such as BaFX:Eu (X=Br or I) and the like, is dispersed in a suitably selected solvent and the dispersant is coated on a support material and then dried and hardened and a stimulable phosphor layer is thereby formed.

In addition, as described in Patent Document 2 for example, there is a vapor deposit type in which a vapor phase deposition method such as vapor deposition or the like is used and a stimulable phosphor such as CsBr:Eu is crystallized on a support material and a stimulable phosphor layer is thereby formed. In the stimulable phosphor sheet of the vapor deposit type, columnar crystal of the stimulable phosphor is formed on a support material.

In the vapor deposit type stimulable phosphor sheet, because dispersion of the excitation light and the photo-stimulated luminescence in the horizontal direction can be controlled, the sharpness of the image can be remarkably improved. The inventors of the present invention realized however, that on the other hand, if the stimulable phosphor layer is made thick (a range from several tens of micrometers to a few millimeters) in order to increase luminance and sensitivity, the columnar crystal will become fragile and tend to be damaged by external force and the like. In particular, it becomes likely for the columnar crystal to receive damage from external forces acting in the perpendicular direction to the growth direction. Thus attention must be paid such that no impact is received during transportation, radiographing or image reading.

An example of the radiation image reading apparatus which reads radiation image information from the stimulable phosphor sheet is that described in Patent Document 3. In this apparatus, a flexible coating-type stimulable phosphor sheet is taken out from a cassette using a suction cup or the like and a contact conveyance method is used in which the stimulable phosphor sheet is nipped between paired rollers and conveyed. In this contact conveyance method, because the surface of the stimulable phosphor is pressed by the roller, if dirt or dust is attached to the roller, the phosphor surface becomes stained and scratched and this causes a critical drawback in that the lifespan of the stimulable phosphor sheet is shortened. In addition, because the scratches or stains on the surface of the stimulable phosphor appear as noise on the image that has been read, it becomes impossible to provide a high quality image for diagnosis. Furthermore, because external forces act on the stimulable phosphor sheet, the vapor deposition type stimulable phosphor sheet is unsuitable.

In order to eliminate the shortcomings of the contact conveyance method, a non-contact conveyance method is proposed in which the stimulable phosphor sheet is attached to a rigid plate member, and only the rigid plate member is contacted (the stimulable phosphor surface is not contacted). The radiation image reading apparatus using this method is described in Patent Document 4 for example.

The stimulable phosphor sheet which this apparatus reads is installed and used in a thin box-shaped portable casing called a cassette. The cassette is composed of a back base to which the stimulable phosphor sheet is attached and a front base which covers the stimulable phosphor sheet.

The back base has a locking pawl which engages with the front base. The locking pawl is configured so as to switch between an engaged state (lock ON) and a disengaged state (lock OFF) with respect to the front base, using a push-latch mechanism. In the engaged state the back base and the front base are joined, while in the disengaged state the back base and the front base can be separated from each other. The back base is formed from a material having a ferromagnetic substance such that it can be stuck to a moving plate described hereinafter using magnetic force.

There are a conveyance device, a sub-scanning device and a main scanning device inside the radiation image reading apparatus described in Patent Document 4. The cassette that is inserted into the radiation image reading apparatus through the reading slot is first caught by the front base using the conveyance device and disengaged using the lock ON/OFF mechanism provided at the conveyance device. Next the back base is delivered to the moving plate of the sub-scanning device due to the rotation of the conveyance device.

The sub-scanning device is composed of a moving plate and a sub-scanning rail which moves the moving plate vertically. The moving plate has a magnet, and when the back base contacts the moving plate due to the rotation of the conveyance device, the back base is stuck by the magnet. Next the back base and the front base are separated when the conveyance device rotates in the direction away from the moving plate.

The moving plate to which the back base is stuck is conveyed upward along the sub-scanning rail (sub-scanned). During the sub-scanning operation, the stimulable phosphor sheet is scanned with a laser beam having a prescribed wavelength using the main scanning device and then photo-stimulated luminescence is taken out as electrical signals using a photoelectric conversion element such as photomultiplier.

However, in the radiation image reading apparatus described in Patent Document 3, because the radiation image information is read while the stimulable phosphor sheet is pulled downwards from the cassette that is fixed on the upper portion of the apparatus, the position of the insertion opening of the cassette is high and it becomes necessary for the radiographic technician (radiologist) or the like to lift the cassette which has been carried by being held in his hand or between his arm and side after radiographing, against gravity up to the high position of the insertion opening, and this was a large burden on the technician.

In the radiation image reading apparatus of Patent Document 4, because the rotation mechanism for rotating the conveyance device at the lower portion of the apparatus, the position of the cassette reading slot is high. In addition, because the reading slot has a support member for supporting the cassette that has been slantingly inserted, the user has a trouble of lifting the cassette higher than the support member. Furthermore, because the cassette is separated by the rotation movement, the area for installing the apparatus (foot print) and the operation space required around the apparatus, especially front space of the cassette reading slot, become large.

[Patent Document 1] Japanese Patent Application Laid-Open 2003-255096 Publication

[Patent Document 2] Japanese Patent Application Laid-Open 2004-239713 Publication

[Patent Document 3] Japanese Patent Application Laid-Open 2004-109252 Publication

[Patent Document 4] Japanese Patent Application Laid-Open 2002-156716 Publication

SUMMARY OF THE INVENTION

An object of this invention is to provide a radiation image reading apparatus as well as a method for reading the radiation image information in which an installation area and operating space are minimized and dimension in the height direction is restricted, and in which it is possible for users such as technicians to easily load a cassette.

This invention is composed of the following methods and apparatuses in order to solve the above problem.

(A) A method for reading radiation image information recorded in a cassette composed of a back base on which a stimulable phosphor sheet is attached and a front base which is provided so as to cover the stimulable phosphor sheet and is joined to the back base, wherein the cassette is inserted in the radiation image reading apparatus in an upright state from the upper surface; the inserted cassette is taken into the apparatus; the front base and back base which are joined in the apparatus are then disengaged to separate them; radiation image information is read from the stimulable phosphor sheet by the scanning device being moved between the front base and the back base; the front base and back base are joined after the reading; and the joined cassette is ejected from the upper surface of the apparatus.

(B) A radiation image reading apparatus for reading radiation image information from a stimulable phosphor sheet in a cassette composed of a back base on which the stimulable phosphor sheet is attached and a front base which is provided so as to cover the stimulable phosphor sheet and is joined to the back base, the radiation image reading apparatus comprising: an insertion opening which is on the upper surface of the housing of the apparatus and through which the cassette is inserted into the apparatus; a moving mechanism for moving the cassette that has been inserted through the insertion opening in the apparatus; a holding mechanism for holding the cassette inside the apparatus; a separating mechanism for separating the front base and the back base; and a scanning device for reading the radiation image information from the stimulable phosphor sheet of the back base that has been separated.

BRIEF DESCRIPTION OF THE DRAWINGS

FIG. 10($b$) is a schematic view of the conveyance mechanism of the radiation image reading apparatus of the invention showing the separation position for the back base.

FIG. 10($c$) is a schematic view of the conveyance mechanism of the radiation image reading apparatus of the invention showing the reading position.

DETAILED DESCRIPTION OF THE PREFERRED EMBODIMENT

Figure 1:
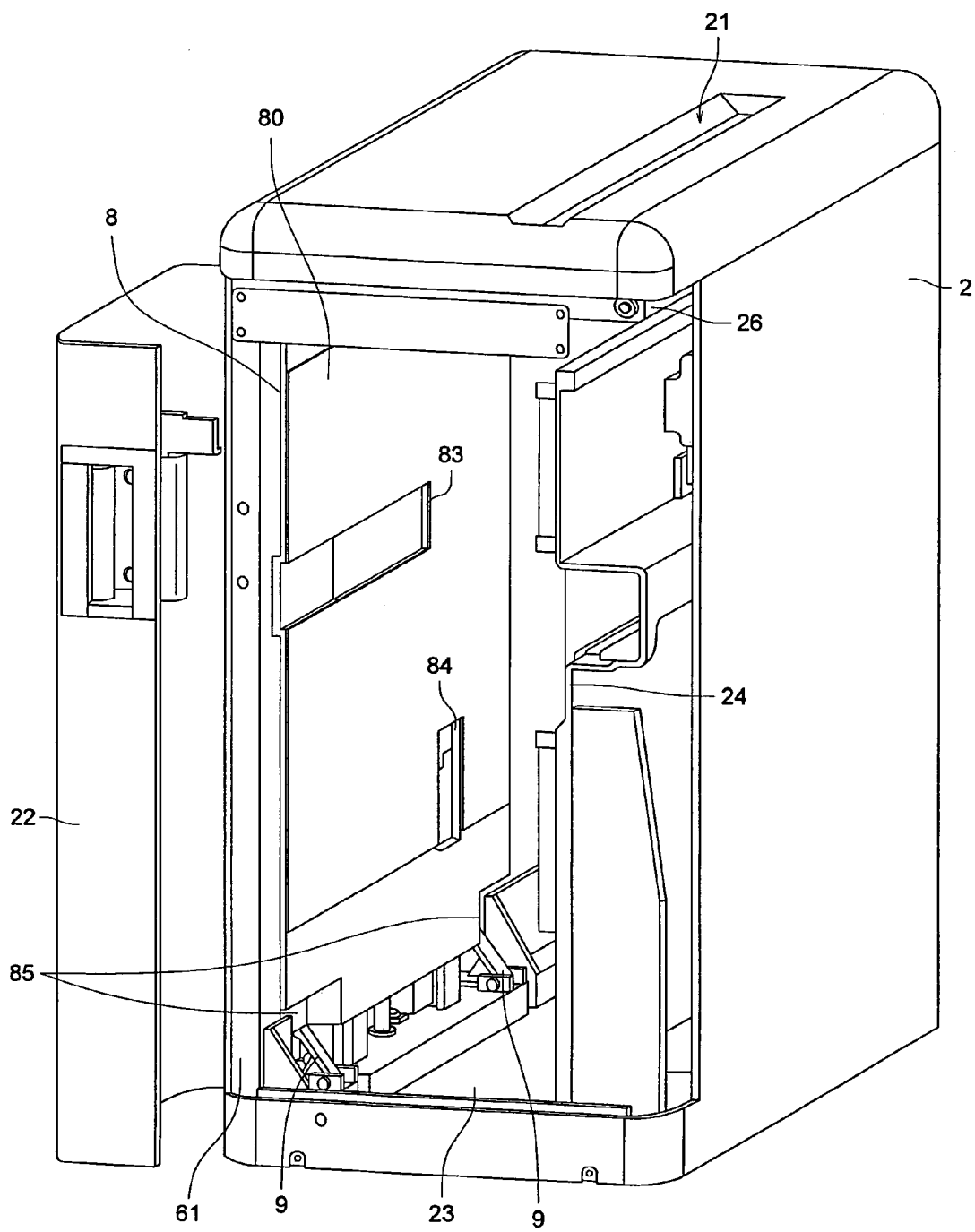
FIG. 1 is a perspective view showing the radiation image reading apparatus of the invention.

First, the preferable embodiments of the inventions on Items (A) and (B) for solving the above problems will be described.

(1) A method for reading radiation image information of Item (A), wherein the back base and the front base are separated by moving at least one of the back base and the front base in the thickness direction of the cassette so that the two are kept substantially parallel to each other.

(2) The method for reading radiation image information of Item (A) or (1), wherein the cassette is inserted in the upper surface of the apparatus with the short sides of the cassette in an upright state.

(3) The methods for reading radiation image information of any one of Items (A), (1) and (2), wherein a stimulable phosphor sheet which has a stimulable phosphor layer formed of a columnar crystal using a vapor phase growing method.

(4) The radiation image reading apparatus of Item (B), wherein: the holding mechanism is composed of a front base holding device for holding the front base and a back base holding device for holding the back base; the separation mechanism is composed of a switching device for switching between the state in which the front base and the back base are joined and the state in which the front base and the back base are separated, and a conveyance device for conveying at least one of the holding devices between the joining position and the reading position of the cassette and separating the front base and the back base so as to be substantially parallel.

(5) The radiation image reading apparatus of Item (B) or (4), wherein the scanning device reads the radiation image information while moving between the front base and the back base that have been separated so as to be substantially parallel.

(6) The radiation image reading apparatus of any one of Items (B), (4) and (5) wherein, the scanning device has an erasing section for irradiating erasing beams which release radiation energy remaining on the stimulable phosphor sheet, and the scanning device reads the radiation image information while moving in one direction between the front base and the back base, and then irradiates the erasing beam on the stimulable phosphor sheet using the erasing section while moving in the opposite direction.

(7) The radiation image reading apparatus of any one of Items (B) and (4)-(6), wherein a CCD is used in the reading section of the scanning device.

(8) The radiation image reading apparatus of any one of Items (B) and (4)-(7), wherein the housing of the apparatus has an inspection door that can be opened and closed at the end in the perpendicular direction of the movement of the front base holding device or the back base holding device.

The method of Item (A) is a method for reading radiation image information recorded in a cassette composed of a back base on which a stimulable phosphor sheet is attached and a front base which is provided so as to cover the stimulable phosphor sheet and joined to the back base. The cassette is inserted in the radiation image reading apparatus in an upright state from the upper surface, the inserted cassette is taken into the apparatus and next the front base and back base which are joined are released to separate them in the apparatus. Radiation image information is read from the stimulable phosphor sheet by the scanning device being moved between the front base and the back base and the front base and back base are joined after the reading and then the joined cassette is ejected from the upper surface of the apparatus.

In the method of Item (A), the cassette is inserted in the radiation image reading apparatus in an upright state from the upper surface, the inserted cassette is taken into the apparatus and next the front base and back base which are joined in advance are released to separate them in the apparatus. Radiation image information is read out from the stimulable phosphor sheet by the scanning device being moved between the front base and the back base and the front base and back base are joined again, after the reading and then the joined cassette is ejected from the upper surface of the apparatus. Because of the above procedure, the height of the apparatus is more restricted compared to the reading method in which the stimulable phosphor sheet is taken out from the cassette in the downward direction, and there is an excellent advantage in that the operation of lifting the cassette against the gravity up to the height of the upper surface of the apparatus becomes unnecessary at the time of inserting the cassette.

Because the cassette can be moved from any directions with respect to the apparatus in a horizontal direction (not vertically) to the top of the apparatus and the cassette can be inserted from the top surface of the apparatus, the user such as the technician may stand at any positions around the apparatus and perform the insertion operation. Thus, the degree of freedom for installation and as well as the degree of freedom for the operational movement line of the worker are greatly improved.

In addition, because the cassette being read is stored in the apparatus and after the reading, the cassette is ejected from the upper surface of the apparatus, a determination as to whether the reading is complete can be made at a glance. Thus a display section for displaying whether processing is in progress is unnecessary and the cost of the apparatus can be reduced.

The method of Item (1) is a method for reading radiation image information of Item (A), wherein the back base and the front base are separated by moving at least one of the back base and the front base in the thickness direction of the cassette so that both are kept substantially parallel to each other.

According to the method of Item (1), because the back base and the front base are separated by moving at least one of the back base and the front base in the thickness direction of the cassette so that both are kept substantially parallel to each other, the space (foot print) required for separating the front base and the back base can be reduced and the height of the apparatus is lower compared to the method in which the front base and back base are separated by rotation movement.

The method of Item (2) is a method for reading radiation image information of Item (A) or (1), wherein the cassette is inserted on the upper surface of the apparatus in an upright state with the short sides of the cassette extending vertically.

In the method of Item (2), the cassette is loaded by inserting the cassette on the upper surface of the apparatus in an upright state with the short sides of the cassette extending vertically, and the height required for separation can be lowered to a height corresponding to the length of the short side of the cassette, and thus the height of the apparatus can be further lower.

The method of Item (3) is the method for reading radiation image information of any one of Items (A), (1) and (2), wherein a stimulable phosphor sheet which has a stimulable phosphor layer formed on a columnar crystal using a vapor phase growing method is used.

In the method of Item (3), by using a stimulable phosphor sheet which has a stimulable phosphor layer formed on a columnar crystal using a vapor phase growing method, dispersion of the excitation light and photo-stimulated luminescence is controlled and thus the sharpness of the image can be improved. Such force that acts in the direction perpendicular to the growth direction of the columnar crystal hardly acts on the phosphor sheet during the read-out operation.

The apparatus of Item (B) is a radiation image reading apparatus for reading radiation image information from a stimulable phosphor sheet in a cassette composed of a back base on which the stimulable phosphor sheet is attached and a front base which is provided so as to cover the stimulable phosphor sheet and joined to the back base. The radiation image reading apparatus is composed of an insertion opening which is on the upper surface of the housing of the apparatus and through which the cassette is inserted into the apparatus, a moving mechanism for moving the cassette that has been inserted through the insertion opening into the apparatus and a holding mechanism for holding the cassette inside the apparatus. The apparatus is further composed of a separating mechanism for separating the front base and the back base and a scanning device for reading the radiation image information from the stimulable phosphor sheet on the back base that has been separated.

In the apparatus of Item (B), because the cassette is inserted into the apparatus through the insertion opening, the cassette that has been inserted through the insertion opening is moved into the apparatus by a moving mechanism, the cassette is held by the holding mechanism, and the front base inside the apparatus and the back base are separated by the separating mechanism, and then the radiation image information is read by the scanning device from the stimulable phosphor sheet on the back base that has been separated, the height of the cassette insertion opening of the apparatus can be restricted and the invention has an excellent effect in that the operation of lifting the cassette against gravity to the height of the insertion opening for the cassette becomes unnecessary.

In addition, because the cassette can be moved horizontally (not vertically) from any directions with respect to the apparatus (for example, along the width direction or length direction of the insertion opening) and the cassette can be inserted from the upper surface of the apparatus, a user such as a technician may stand at any positions around the apparatus and perform the cassette insertion operation and the degree of freedom for installation as well as the degree of freedom for the operational movement line of the worker are greatly improved.

In the apparatus of Item (4), the radiation image reading apparatus of Item (B), wherein: the holding mechanism is composed of a front base holding device for holding the front base and a back base holding device for holding the back base, the separation mechanism is composed of a switching device for switching the front and back bases between a joined state and a separated state and a conveyance device for conveying at least one of the holding devices in the thickness direction and separating the front base and the back base so as to be substantially parallel.

In the apparatus of Item (4), because the front base and back base are switched to a separated state by the switching device, and then at least one of the holding devices is moved in parallel in the direction perpendicular to the base surface to separate the back base and the front base and after the radiation image information is read, the holding mechanism is once again moved in parallel in the direction perpendicular to the base surface by the conveying device and the front base and back base are coupled, and the front base and the back base are switched to a joined state by the switching device, the space required for separating the front base and the back base can be reduced and the apparatus becomes more compact compared to the radiation image reading apparatus in which the front base and the back base are separated by rotational movement.

The apparatus of Item (5) is a radiation image reading apparatus of Item (B) or (4), wherein the scanning device reads the radiation image information while moving between the front base and the back base that have been separated so as to be parallel.

In the apparatus of Item (5), because the scanning device reads the radiation image information while moving between the front base and the back base that have been separated so as to be parallel, the same space can be used for the space required for separating the front base and the back base and the space required for reading the radiation image information, and thus the apparatus can be made more compact.

The apparatus of Item (6) is the radiation image reading apparatus of any one of Items (B), (4) and (5) wherein, the scanning device has an erasing section for irradiating erasing beams which release radiation energy remaining on the stimulable phosphor sheet, and the scanning device reads the radiation image information while moving in one direction between the front base and the back base, and then irradiates the erasing beam on the stimulable phosphor sheet using the erasing section while moving in the opposite direction.

In the apparatus of Item (6), because the scanning device reads the radiation image information from the stimulable phosphor sheet while moving in one direction, and then irradiates the erasing beam on the stimulable phosphor sheet using the erasing section while moving in the opposite direction, the driving power of the reading device can be used also for the erasing section and the apparatus can be made more compact and the time required for reading and erasing is shortened.

The apparatus of Item (7) is the radiation image reading apparatus of any one of Items (B) and (4)-(6), wherein a CCD is used in the reading section of the scanning device.

In the apparatus of Item (7), because a CCD is used in the scanning device, power consumption can be reduced compared to the apparatus using the photomultiplier.

The apparatus Item (8) is the radiation image reading apparatus of any one of Items (B) and (4)-(7), wherein the housing of the apparatus has an inspection door that can be opened and closed at the end in the perpendicular direction of the movement of the back base holding device.

In the apparatus of Item (8), because the housing of the apparatus has an inspection door that can be opened and closed at the end in the perpendicular direction of the movement of the back base holding device, the space in which the back base holding device moves can be utilized as an operation space for performing maintenance operations by opening the inspection door, and thus the apparatus can be made more compact.

The following is a detailed description of the embodiments of this invention. FIG. 1 is a perspective view showing the radiation image reading apparatus in which this invention is applied. The radiation image reading apparatus has a cassette loading inlet 21, whose width is a little wider than the thickness of the cassette 1, on the upper surface of the substantially rectangular box-shaped housing 2 in the longitudinal direction, and has the various sections required for reading the cassette 1 inside.

In addition, an inspection door 22 which is free to open and close is provided on a side in the right-and-left direction of the housing 2. FIG. 1 shows the state in which the inspection door 22 is open.

Like the conventional cassette, the cassette 1 comprises a back base 11 to which the stimulable phosphor sheet is attached and a front base 12 which covers the stimulable phosphor sheet and engages with the back base 11 while covering it. An open and close lock (not shown) is at the middle portion on the sides of the cassette 1 and the engaged state and disengaged state of the front base 12 and the back base 11 are switched by pushing the open and close lock (push-latch mechanism). In addition, the back base 11 comprises a material that is attracted by magnets.

The stimulable phosphor sheet used herein maybe one formed by coating a stimulable phosphor such as BaFBr:Eu, BaFI:Eu on a support material to form a stimulable phosphor layer, or alternatively one in which a stimulable phosphor such as CsBr:Eu is vapor deposited on a support material and a stimulable phosphor layer of columnar crystals is thereby formed. The radiation image reading apparatus in which this invention is applied in particular, is suitable for reading on a stimulable phosphor sheet having a stimulable phosphor layer of columnar crystals which are easily damaged by an external force, especially such a force that acts in the direction perpendicular to the growth direction of the columnar crystal.

Figure 2:
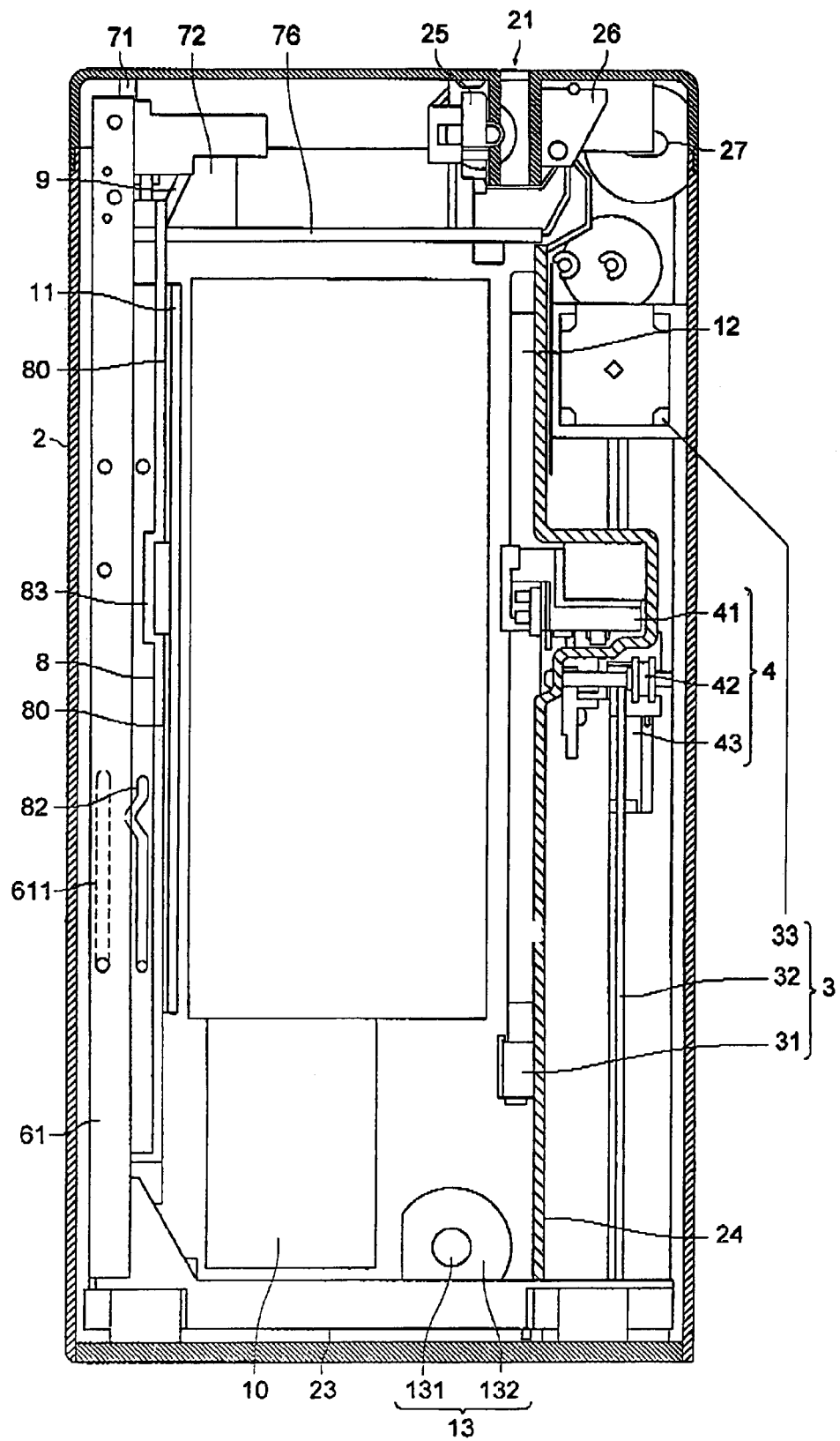
FIG. 2 is a vertical sectional view showing the radiation image reading apparatus of the invention.

FIG. 2 is an vertical sectional view in which the apparatus into which the cassette 1 is inserted is viewed from the inspection door 22 side. The cassette loading inlet 21 has a bar-code reader 25 and a shutter unit 26. The bar-code reader reads information such as the size of the cassette 1 from the bar code (not shown) on the back base 11 of the cassette 1. The shutter unit 26 is driven by the shutter motor 27 and opens and closes the cassette loading inlet 21.

In FIG. 2, the right portion of the cassette loading inlet 21 is thin while the left portion is thick. The right portion of the cassette loading inlet 21 has an elevating mechanism 3 which lowers the cassette 1 that has been inserted into the cassette loading inlet 21 and also raises the cassette 1 that has been read, for ejection from the cassette loading inlet 21, a holding mechanism for holding the front base 12 of the cassette inside the apparatus and a lock ON/OFF mechanism for pressing the ON/OFF lock of the cassette 1 and further a holding plate 24 which holds these parts is disposed vertically on a base plate 23. The cassette 1 is inserted into the cassette loading inlet 21 such that the front base 12 comes in contact with the holding plate 24 and the open and close lock faces toward the right side of the apparatus (back side in FIG. 2).

Figure 3:
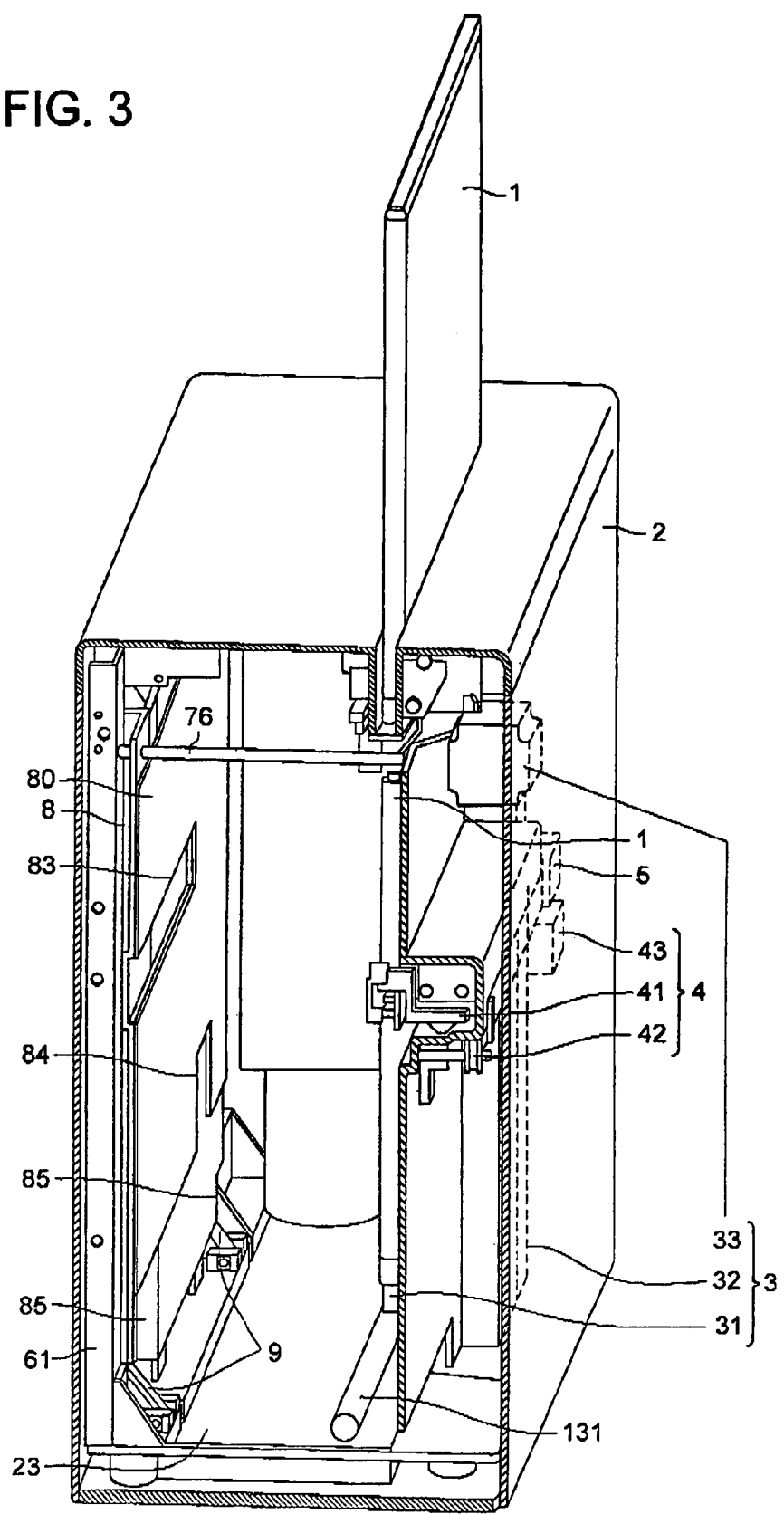
FIG. 3 is a perspective view showing the radiation image reading apparatus of the invention.

The lock ON/OFF mechanism is not shown in FIG. 2, but it is disposed further toward the right side of the apparatus (back side in FIG. 2) than the cassette 1 (See FIG. 3). The elevating mechanism 3 is composed of a platform 31 which holds the lower portion of the cassette 1 that has been inserted into the apparatus, a platform holding portion (not shown) which holds the platform 31, an elevating belt 32 which is connected to the platform holding portion and the elevating motor 33 which rotates the elevating belt 32. When the elevating motor 33 is driven, the elevating belt 32 is rotated and the platform is raised.

The holding mechanism 4 is composed of a pushing portion 41 which pushes the cassette 1 that has been inserted into the apparatus in the width direction (the depth direction perpendicular to the sheet where FIG. 2 is drawn), a horizontal belt 42 which is connected to the pushing portion 41 and a width adjusting motor 43 for rotating the horizontal belt 42. When the width adjusting motor 43 is driven, the horizontal belt 42 rotates and the pushing portion 41 is driven in the width direction of the cassette 1. The pushing portion 41 is driven in the width direction of cassette 1 to push the cassette 1 in the depth direction of FIG. 2. The holding plate 24 has a locking portion which is not shown, but locks the cassette 1 that is pushed by the pushing portion 41 and which is positioned further to the depth side of the FIG. 2 than the cassette 1. The cassette 1 is held at both side portions by the pushing portion 41 and the locking portion.

FIG. 3 is a perspective view showing the state in which the cassette 1 is inserted in the cassette loading inlet 21 and also the state in which the cassette 1 is held by the holding mechanism 4. First, when the cassette 1 is inserted into the cassette loading inlet 21 with the shutter in a closed state, the bar-code reader 25 reads the bar code on the cassette 1 and reads information on the size of the cassette 1 and the like. If insertion direction of the cassette 1 is incorrect, the user is alerted.

Next, the shutter motor 27 is driven and the shutter unit 26 is opened. If it is detected that the shutter unit 26 is completely open, the shutter motor 27 stops.

When the shutter opens, cassette 1 slides down from the shutter and is loaded on the platform 31. At this time the platform 31 has been raised to the uppermost position. When detection is made that the cassette 1 is on the platform 31, the vertical position of the cassette 1 is adjusted such that the height of the open and close lock of the cassette 1 is at the height of the lock ON/OFF position.

When the cassette 1 has been completely stored inside the apparatus, the shutter motor 27 is driven and the shutter unit 26 closes. The shutter unit 27 stops when it is detected that the shutter unit 26 is completely closed.

Next, the pushing portion 41 pushes the cassette 1 from the left side of the apparatus (front side in FIG. 3) to the right side thereof (back side in FIG. 3), and both sides of the cassette 1 are held when it comes in contact with the locking portion. When the lock ON/OFF mechanism is operated in this state, the front base 12 and the back base 11 are switched to a disengaged state.

Furthermore, in FIG. 2 the portion further to the left than the cassette loading inlet 21 has a separating mechanism which holds the back base 11 of the cassette 1 whose front base 12 and back base 11 have become separable and separates it from the front base 12, an optical unit 10 which performs main scanning of the stimulable phosphor sheet of the separated back base 11, and a linear motor 13 which drives the optical unit 10 in the perpendicular direction on FIG. 2 (sub-scanning).

Figure 4:
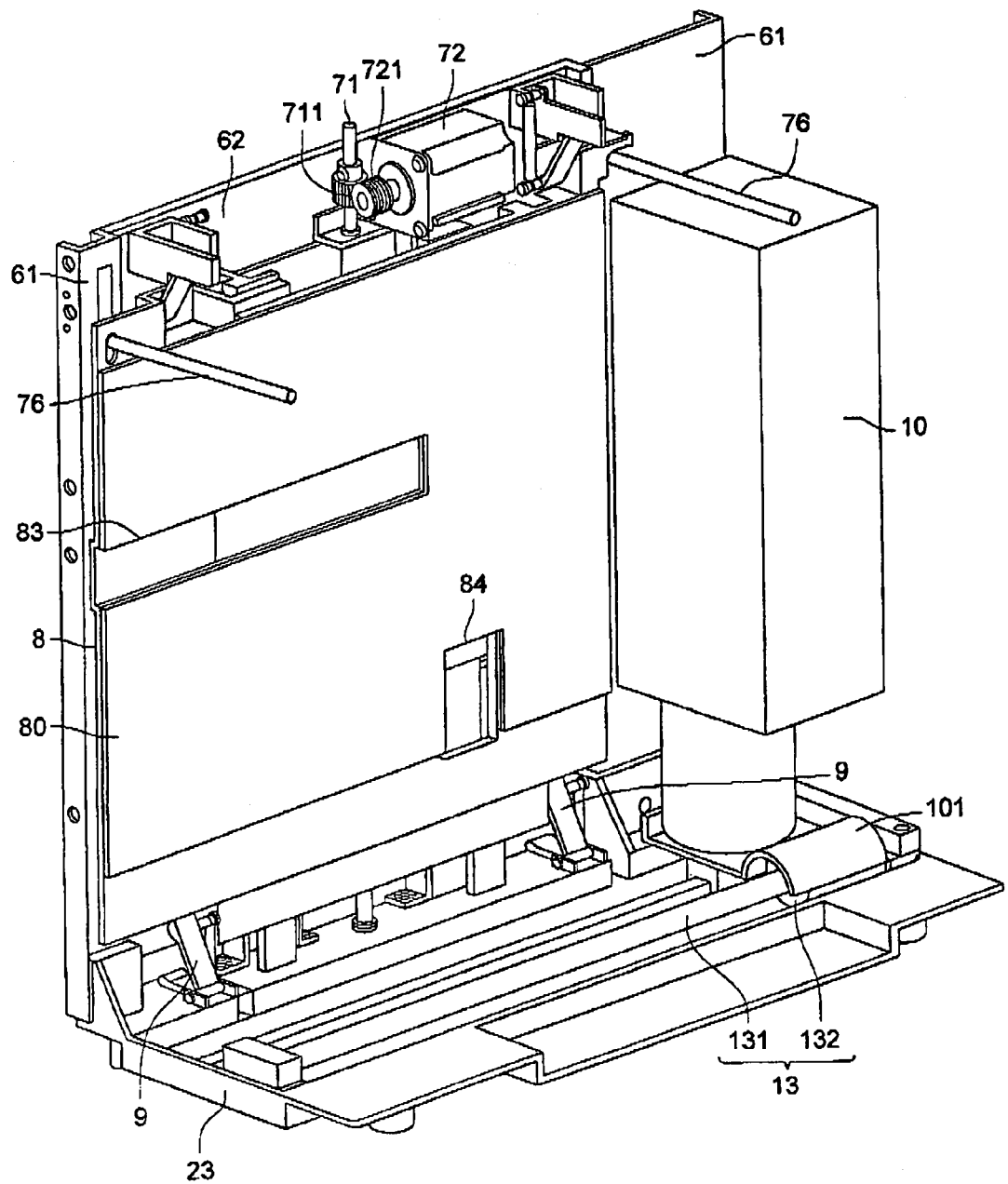
FIG. 4 is a perspective view showing the internal structure of the radiation image reading apparatus of the invention.
Figure 5:
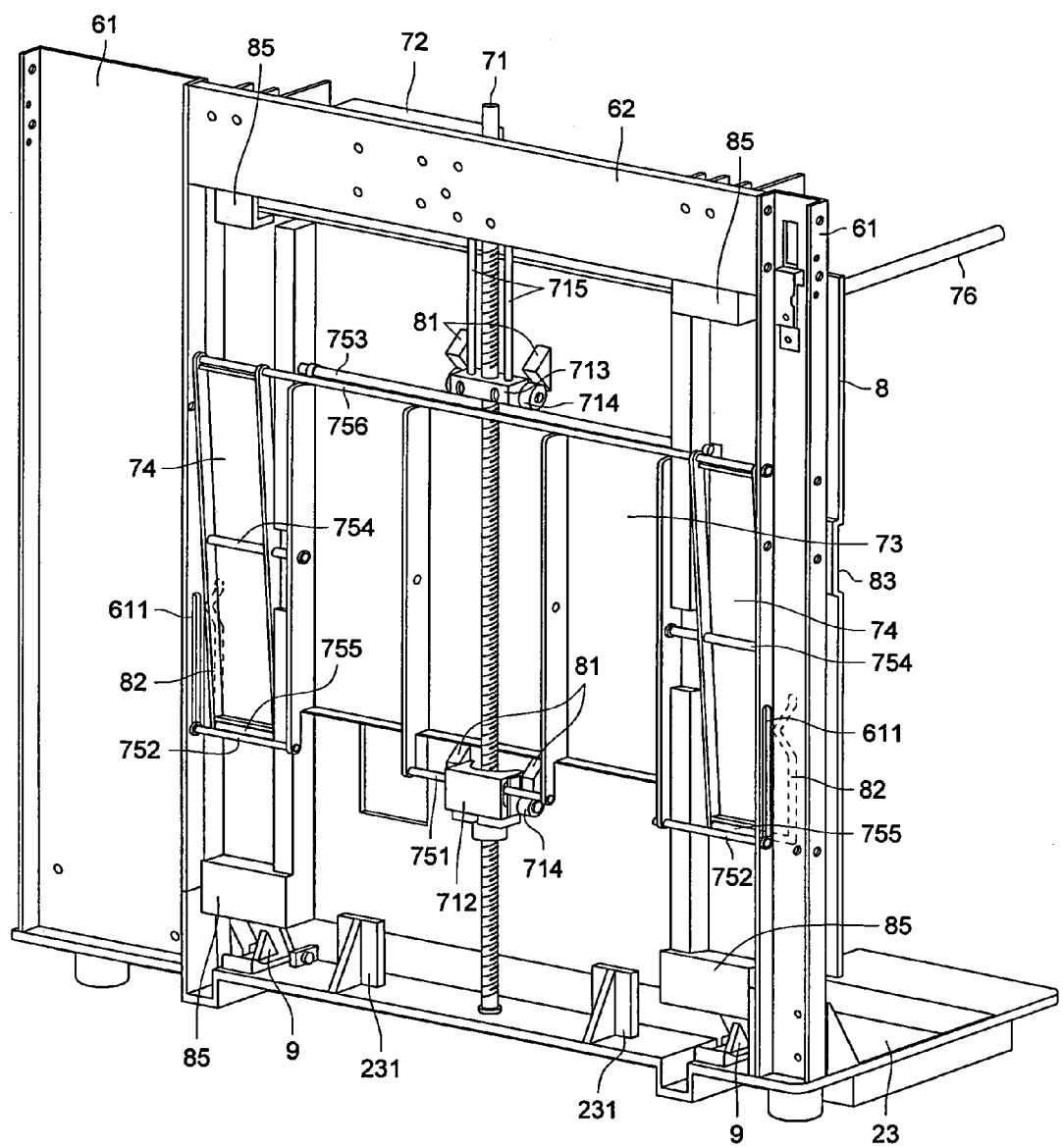
FIG. 5 is a perspective view showing the internal structure of the radiation image reading apparatus of the invention.

The separating mechanism has a schematic structure composed of support columns 61, a beam plate 62, a conveyance mechanism and a moving plate 8. FIG. 4 is a perspective view of the separating mechanism viewed from the cassette 1 side (the right side of FIG. 2) and FIG. 5 is a perspective view seen from the back side (the left side of FIG. 2). The support columns 61 are provided perpendicular to the base plate 23 and are away from each other in the depth direction of the FIG. 2. The beam plate 62 connects the upper ends of the two support columns to each other. There is, inside the frame like structure composed of the base plate 23, the support columns 61 and the beam plate 62, a conveyance mechanism moving the moving plate 8 in parallel in the perpendicular direction to the plate surface.

As shown in FIG. 4 and FIG. 5, the conveyance mechanism is composed of a shaft 71, a conveyance motor 72, a first link 73, and a second link 74. The ball screw 71 is provided vertically such that the top and bottom are rotatably supported on the base plate 23 and the beam plate 62. The ball screw 71 engages with the worm 721 which is provided on the conveyance motor 72 via a worm wheel 711 provided on the top thereof. The conveyance motor 72 is on the beam plate 62 and rotates the ball screw 71 via the worm wheel 711 and the worm 721.

The ball screw 71 has moving bodies 712 and 713 provided so as to be separated in the vertical direction. The moving bodies 712 and 713 are mounted on the ball screw 71 and they are moved vertically by the ball screw 71 being rotated.

Figure 6:
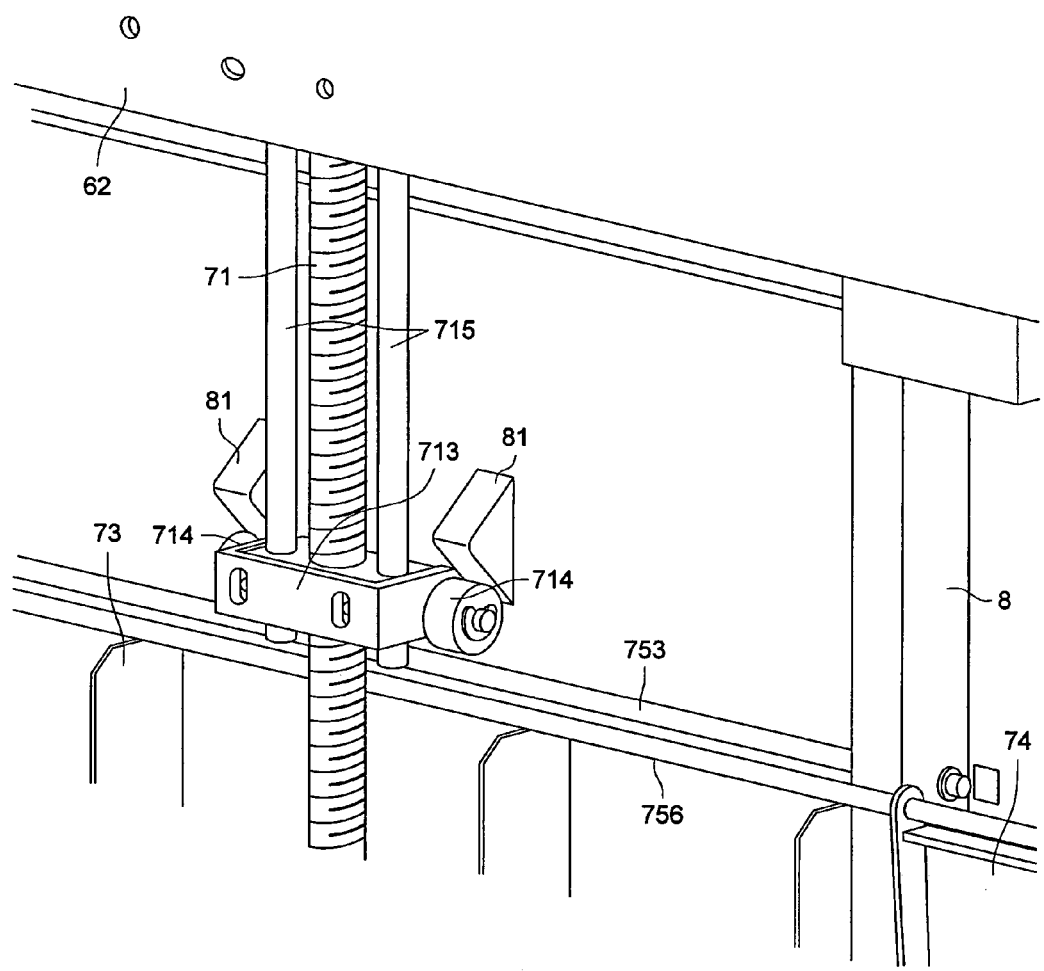
FIG. 6 is a main part perspective view showing the internal structure of the radiation image reading apparatus of the invention.

As shown in FIG. 6, the vertical shafts 715 which are parallel to the ball screw 71 are fitted through the upper moving body 713. As a result, rotation of the moving bodies 712 and 713 along with ball screw 71 is prevented, and the moving bodies 712 and 713 move vertically along the vertical shaft 715 due to the rotation of the ball screw 71.

Figure 7:
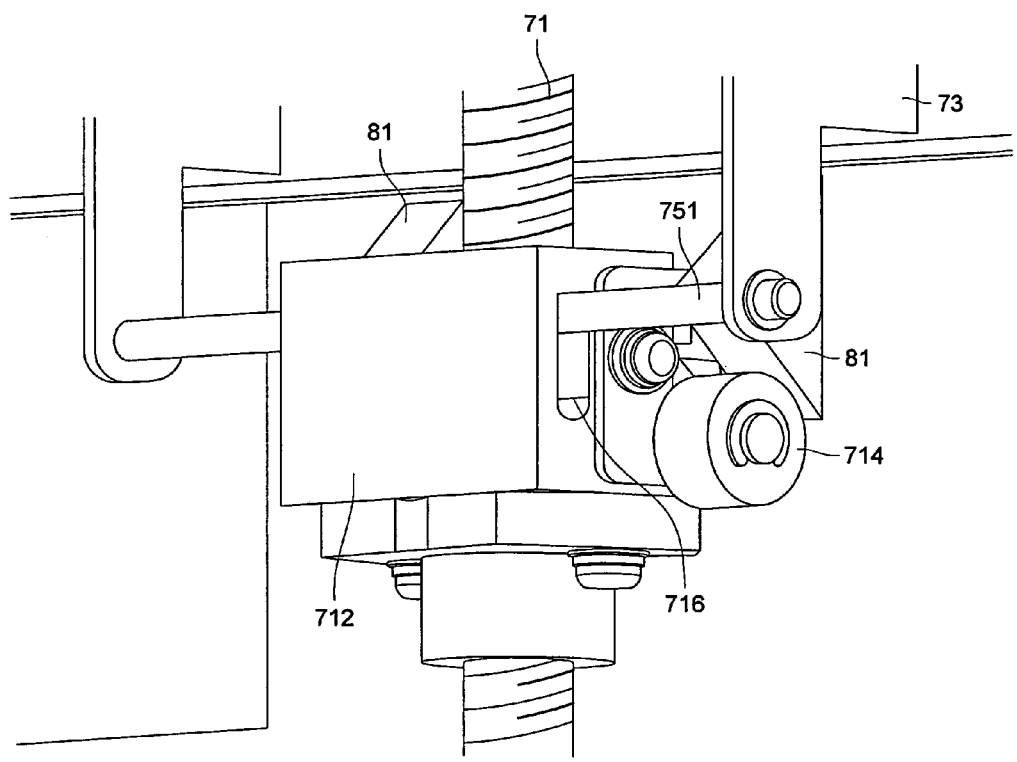
FIG. 7 is a main part perspective view showing the internal structure of the radiation image reading apparatus of the invention.

As shown in FIGS. 6 and 7, both sides of the upper and lower moving bodies 712 and 713 have rollers 714. The roller 714 come in contact with the cams 81 which are provided on the back surface of the moving plate 8. When the moving bodies 712 and 713 are raised, the moving plate 8 is moved away from the moving bodies 712 and 713 due to the rollers 714 pressing the cams 81. Large force is required for first link 73 and the second link 74 to be described hereinafter to drive the moving plate 8 when it start to move, but the force required at the start can be reduced by driving the rollers 714 when the moving plates start moving.

Further, by changing the position of the upper and lower moving bodies 712 and 713 and the cams 81, the timing with which the rollers 714 press the cams 81 can be changed and the upper and lower rollers 714 can operate with different timing.

As shown in FIG. 7, the lower moving body 712 has a long hole 716, and is connected to the first link 73 via a connecting shaft that is inserted through the long hole 716. For this reason, when the lower moving body 712 is raised while the roller 714 presses the cam 81, force is not applied to the first link 73 from the lower moving body 712.

The lower end of the first link 73 has the connecting shaft 751 connected with the lower moving body 712 at the center and a sliding shaft 752 connected slidably with the support column 61 at both ends. As shown in FIG. 2 or 5, the support column 61 has cam groove 611 which is linear in the vertical direction, and the sliding shaft 752 sliding on the support column 61 are held so as to slide up and down along the cam groove 611 by being inserted into the cam groove 611.

The upper end of the first link 73 has a rotating shaft 753 which is connected to the moving plate 8 so as to be connected rotatably via an elastic body that is not shown. The first link 73 is mounted on the moving plate 8 so as to swing via the rotating shaft 753. The elastic body absorbs the impact when the moving plate 8 is adhered to the back base 11 or when it is removed away from the back base 11.

In addition, the both ends of the first link 73 have the connecting shaft 754 at the middle position in the vertical direction, which connects with the second link 74.

The second links 74 are mounted on the first link 73 at both end portions. The lower ends of the second links 74 have sliding shafts 755 which are connected to the moving plate 8 so as to be slidable. As shown in FIG. 2, the moving plate 8 has substantially linear cam grooves 82 in the vertical direction and the sliding shafts 755 are inserted into the cam grooves 82 so as to be slidable. It is to be noted that as shown in FIG. 2, the upper portion of the cam groove 82 is formed as a V-shaped configuration which protrudes toward the support column 61.

The upper end of the second link 74 has a rotation shaft 756 which is connected to the right and left second links 74 and is held at both ends on the support column 61 so as to be rotatable. The second links 74 are mounted rotatably on the support column 61 by the rotating shaft 756.

The middle position in the vertical direction of the second link 74 has a connecting shaft 754 which connects with the first link 73 inserted therein.

The moving plate 8 is moved in parallel in the vertical direction on the plate surface by the moving apparatus, and moves toward the right side in FIG. 2 to come in contact with the back base 11 of the cassette 1, or moves toward the left side in FIG. 2 and is fixed parallel to the left-side wall of the housing 2. A magnet 80 is stuck to the surface of the moving plate 8 which comes in contact with the back base 11. A rubber magnet or the like may be used as the magnet 80 herein.

The surface which contacts the back base 11 of the moving plate 8 has cutouts 83 and 84 in the moving range of the pushing portion 41 and the platform holding portion so as not to obstruct the pushing portion 41 and the platform holding portion when the surface comes in contact with the back base 11.

Figure 8:
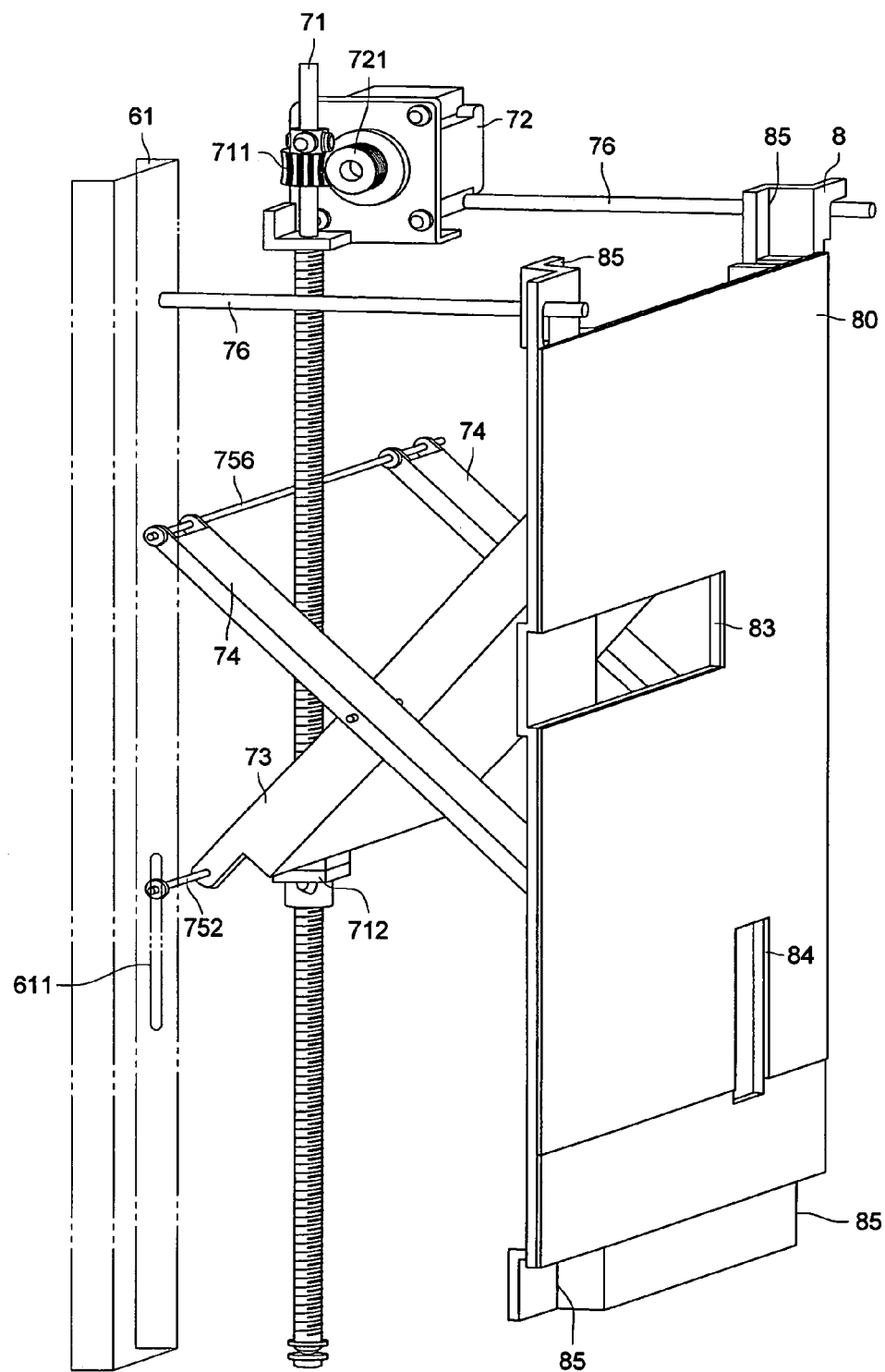
FIG. 8 is a main part perspective view showing the internal structure of the radiation image reading apparatus of the invention.

When the moving bodies 712 and 713 are raised, the cam 81 is first pushed by the roller 714 and the moving plate is started to move. Next, as shown in FIG. 8, the lower end of the first link 73 is raised and the first link 73 is swung with respect to the moving plate 8, and at the same time, the second links 74 that are connected to the first link 73 are swung with respect to the support columns 61 and thereby the moving plate 8 moves toward the holding plate 24. Conversely, when the moving bodies 712 and 713 are lowered, the first link 73 and the second links 74 are swung in the opposite direction, and the lower end of the first link 73 and the second links 74 are lowered and the moving plate 8 is moved toward the support column 61 side.

It is to be noted that the upper end of the moving plate 8 engages with the rails 76 that are provided horizontally between the upper ends of the two support columns 61 and the upper end of holding plate 24, and the moving plate 8 moves along the rails 76.

Figure 9:
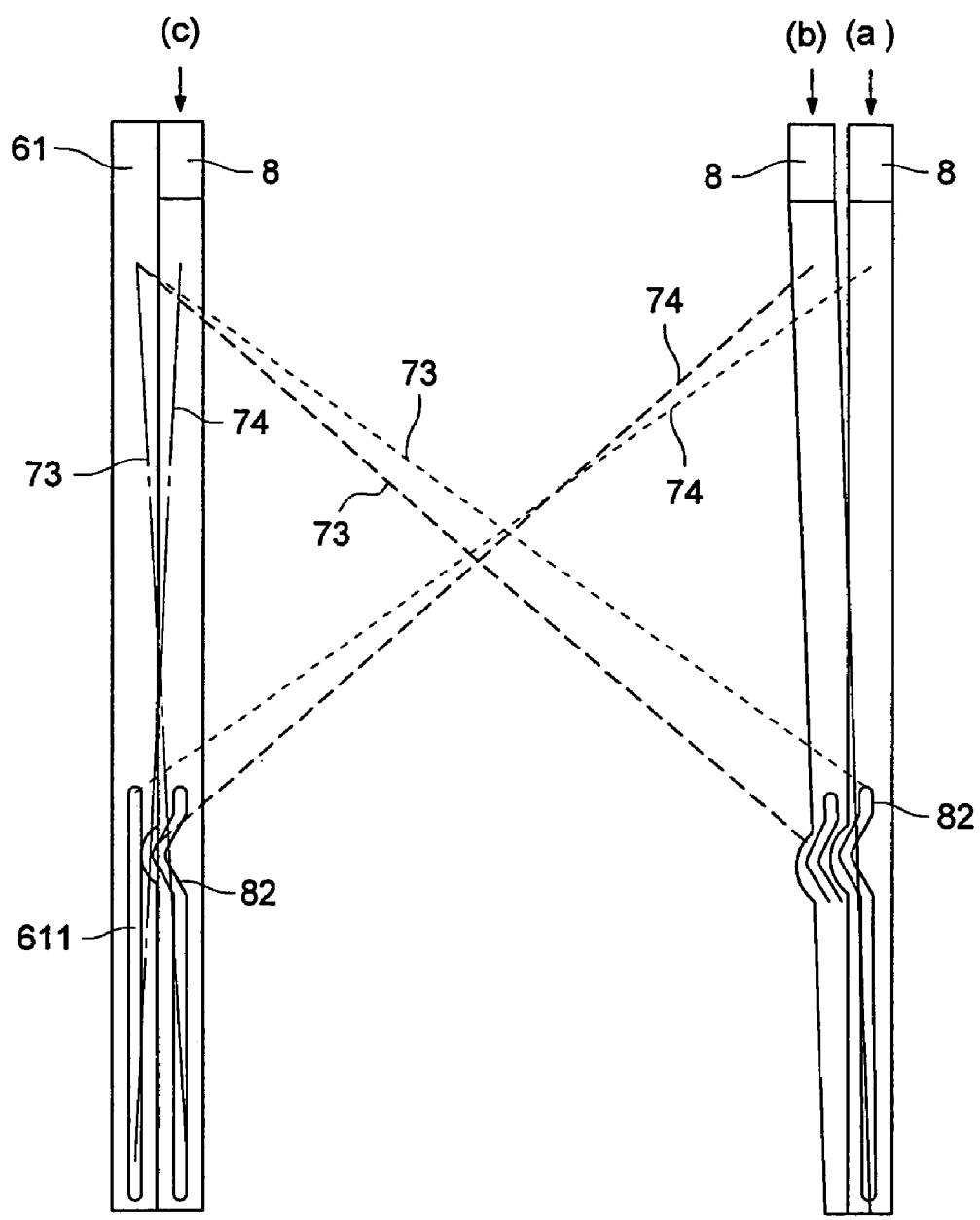
FIG. 9 is a schematic view showing the conveyance mechanism of the radiation image reading apparatus of the invention.

As shown in FIG. 9, when the moving bodies 712 and 713 are raised, the configuration of the cam grooves 82 which are provided on the moving plate 8 and has a V-shaped configuration which protrudes toward the support column 61 at the upper portion, and thus when the sliding shaft 755 is at the position of the V-shaped configuration of the cam groove 82, the lower portion of the moving plate 8 advances earlier than the upper portion. Conversely, when the moving bodies 712 and 713 are lowered, the upper portion of the moving plate 8 moves backward earlier than the lower portion. Here, FIG. 9(*a*) is the delivery position of the back base 11 to the moving plate 8, FIG. 9(*b*) is the separation position of the moving plate 8 and the back base 11, and FIG. 9(*c*) is the reading position.

Figure 10A:
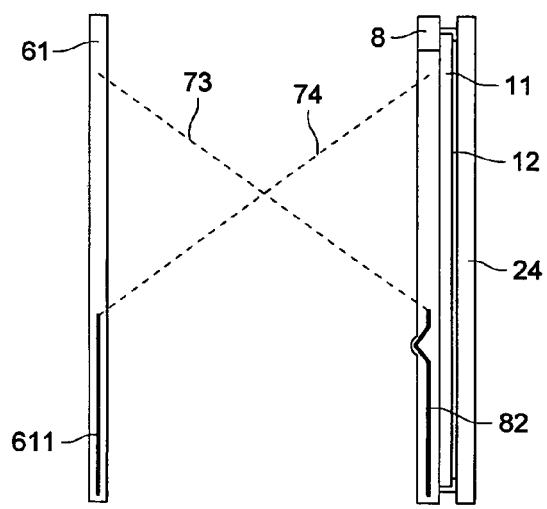
FIG. 10($a$) is a schematic view of the conveyance mechanism of the radiation image reading apparatus of the invention showing the delivery position for the back base.
Figure 10B:
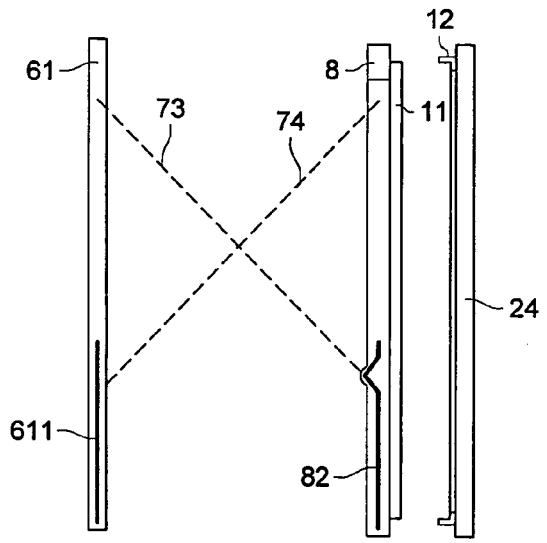
Figure 10C:
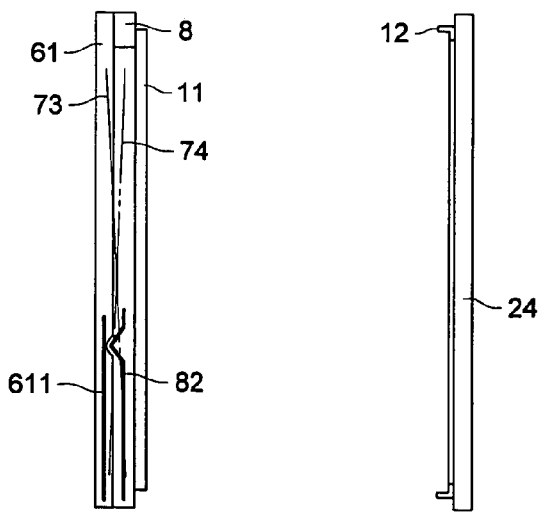

When the back base 11 gets separated from the front base 12 by the separation mechanism, as shown in FIG. 10(*a*), first, the moving plate 8 is brought in contact with the back base 11 of the cassette 1 that has been inserted into the apparatus. The lower portion of the moving plate 8 at this time contacts the back base 11 first, but because there is an elastic body at the first link 73, it can be ensured that entire surface of the back base 11 is brought in close contact with the moving plate 8 due to the stretching of the elastic body.

Next, the lock ON/OFF mechanism is operated and the cassette 1 is put in the disengaged state. Subsequently, the moving plate 8 is moved backward (FIG. 10(*b*)) and then fixed at the reading position (FIG. 10(*c*)).

As shown in FIG. 8, there are recesses 85 at the four corners of the moving plate 8 for fixing the moving plate 8 at the reading position. Also, the base plate 23 and the beam plate 62 have tumblers 9 for fixing the moving plate 8 by pushing the recesses 85 to the support column 61 side.

Figure 11:
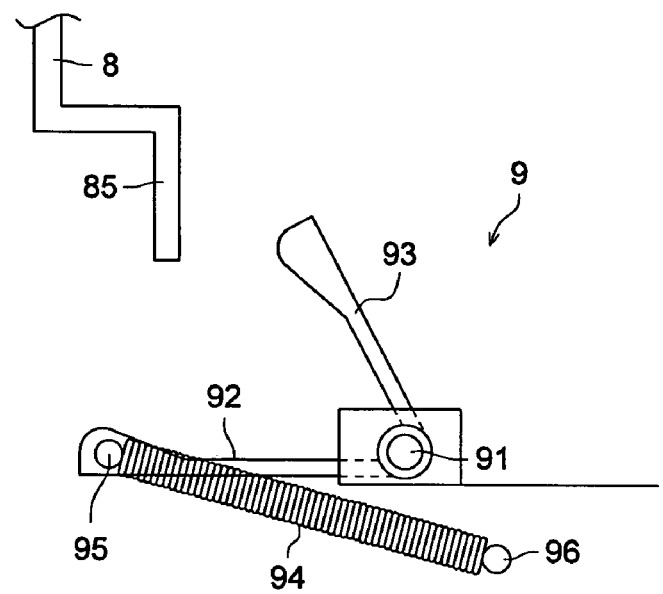
FIG. 11($a$) is a schematic view of the tumbler of the radiation image reading apparatus of the invention showing the state where the moving plate is released FIG. 11($b$) is a schematic view of the tumbler of the radiation image reading apparatus of the invention showing the state where the moving plate is restrained.
Figure 11:
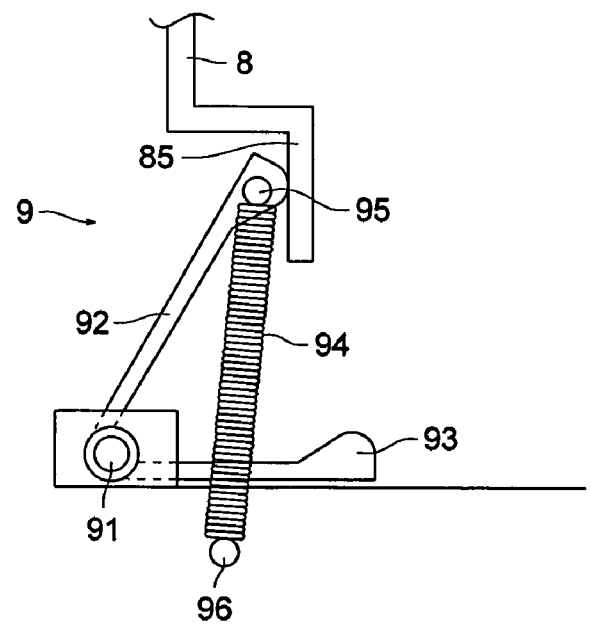
Figure 12:
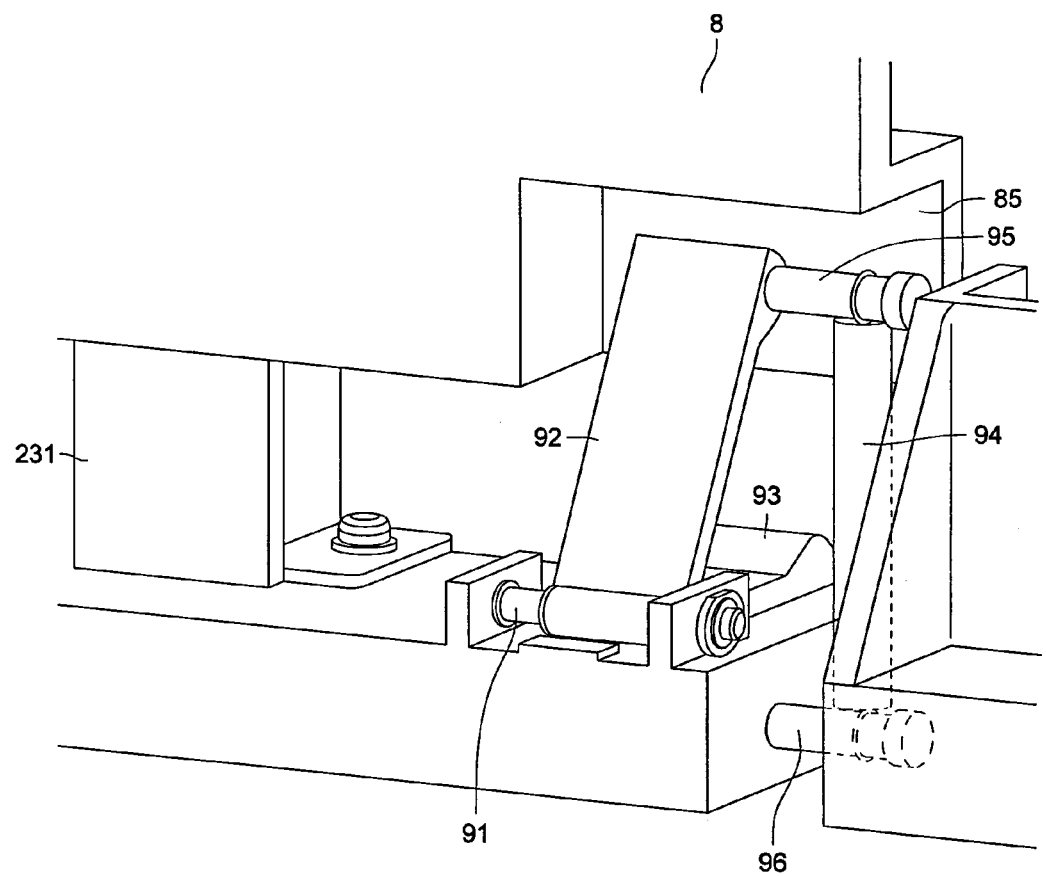
FIG. 12 is a perspective view showing the state where the moving plate is restrained by the tumbler of FIG. 11.
Figure 13:
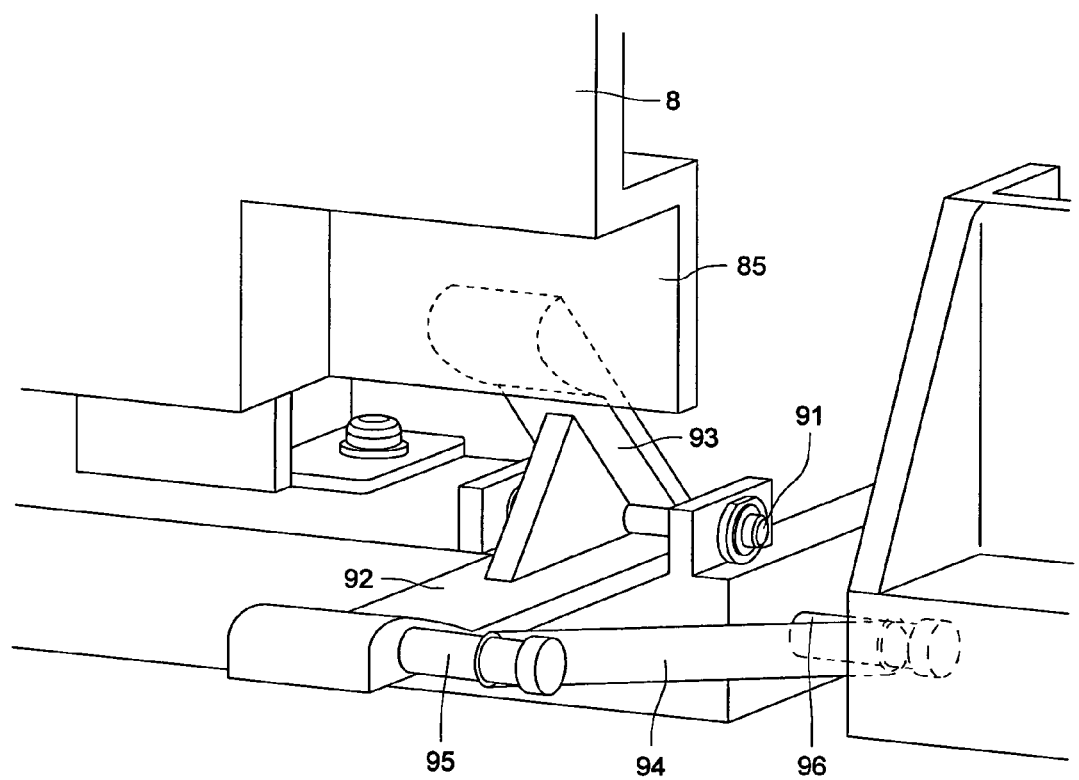
FIG. 13 is a perspective view showing the state where the moving plate is released by the tumbler of FIG. 11.

As shown in FIGS. 11-13, the tumbler 9 is composed of the rotating shaft 91 which is fixed on the base plate 23 (or the beam plate 62) so as to be rotatable, the first lever 92 which is connected to the rotating shaft 91 at the end; the second lever 93 which is connected to the rotating shaft 91 at the end and forms an acute angle with the first lever 92, and a tumbler spring 94. In FIGS. 11-13, the tumblers 9 are provided on the base plate 23, but the tumblers 9 which are provided on the beam plate 62 is almost the same except that the top and bottom are reversed.

The tumbler spring 94 connects the first spring fixing portion 95 which is provided on the first lever 92 and the second spring fixing portion 96 which is provided on the base plate 23 (or the beam plate 62), and is stretched so as to keep the distance between the first spring fixing portion 95 and the second spring fixing portion 96 to be a minimum length. For example, as shown in FIG. 11(*a*), when the first spring fixing portion 95 is lower than the straight line connecting the second spring fixing portion 96 and the rotating shaft 95, the first spring fixing portion 95 and the second spring fixing portion 96 are separated by the minimum distance by rotating the first lever 92 in the direction such that it is laid flat. On the other hand, as shown in FIG. 11(*b*), when the first spring fixing portion 95 is higher than straight line connecting the second spring fixing portion 96 and the rotating shaft 95, the first spring fixing portion 95 and the second spring fixing portion 96 are separated by the minimum distance by rotating the first lever 92 in the direction such that it is erected. The tumbler spring 94 is stretched out more in the state shown in FIG. 11(*a*) than in the state shown in FIG. 11(*b*) and elastic force is more stored.

When the moving plate 8 is fixed at the reading position, the moving plate 8 moves from the left side to the right side in FIG. 11(*a*). The lower end of the moving plate 8 comes in contact with the second lever 93, and when it is moved further to the right, the tumbler 9 that is pushed by the moving plate 8 rotates in the clockwise direction. When the first spring fixing portion 95 is moved until it is higher than the straight line connecting the second spring fixing portion 96 and the rotating shaft 91, tumbler spring 94 contracts, and the stored elastic force is released to rotate the tumbler 9, and as shown in FIG. 11(*b*), the first lever 92 pushes the moving plate 8 to the right, and as shown in FIG. 12, the moving plate 8 becomes in a restricted state. At this time the moving plate 8 comes in contact with a position restricting block 231 that is mounted on the base plate 23, and becomes fixed. Because force is transmitted from the first link 73 to the lower moving body 712 via the connecting shaft 751 which passes through long hole 716, when the tumbler 9 comes in contact with the moving plate 8, load is not applied to the lower moving body 712 or the ball screw 71.

When the moving plate 8 is moved from the reading position to the delivery position for the back base 11, the moving plate 8 is moved from the state in FIG. 11(*b*) to the left side to rotate the tumbler 9 counterclockwise. When the first spring fixing portion 95 is moved until it is lower than the straight line connection the second spring fixing portion 96 and the rotating shaft 91, the tumbler 9 rotates due to the contraction of the tumbler spring 94. As shown in FIGS. 11(*a*) and 13, the moving plate 8 becomes in the released state. At this time there is an accumulation of elastic force in the tumbler spring 94 and returns to a standby state for restricting the moving plate 8 again.

The linear motor 13 which drives the optical unit 10 is composed of stator 131 which is fixed on the upper portion of the base plate 23 in the width direction of the cassette 1 (the depth direction in FIG. 2) and a moving armature which is fixed on the lower portion of the conveyance table which conveys the optical unit 10. The stator 131 is formed such that the multiple magnets each of which and the adjacent magnets are repelling each other are stored inside a pipe-shaped member and is inserted through the center of the moving armature 132.

A coil is stored inside the moving armature 132. A coil group is composed of a plurality of phases, for example three phases may be used as the coil, but the coil is not limited thereto. The moving armature 132 has an insertion hole through which the stator 131 is inserted. When current is allowed to pass into the coil, the moving armature 132 obtains a magnetic force repelling the magnet stored in the stator 131 and moves in the axial direction of the stator 131.

The optical element 10 moves between the moving plate 8 that is holding the back base 11 and is fixed at the reading position, and the holding plate 24 that is holding the front base 12. The optical unit 10 has a reading section, although it is not illustrated, composed of the laser irradiation device in which a laser beam is irradiated on a stimulable phosphor sheet while scanning in the direction orthogonal to the movement direction of the optical unit 10, a light guide plate which guides photo-stimulated luminescence that is excited by the laser beam irradiated on the stimulable phosphor sheet by the laser beam irradiation device, a light condensing tube condensing the photo-stimulated luminescence guided by the light guide plate and a photoelectric conversion device for converting the photo-stimulated luminescence condensed by the light condensing tube into electric signals. A photomultiplier or a CCD (charge-coupled device) and the like may be used as the photoelectric conversion device.

The optical unit 10 has an erasing section for irradiating erasing beams on the stimulable phosphor sheet to release radiation energy remaining on the stimulable phosphor sheet after the reading process of radiation energy. As a result, the radiation image information can be read from the stimulable phosphor sheet on the forward path of the optical unit 10 and the remaining radiation energy can be released from the stimulable phosphor sheet on the backward path.

The stimulable phosphor sheet is read by the optical unit 10, and the stimulable phosphor sheet from which the remaining radiation energy has been released and the back base 11 is coupled with the front base 12 by driving the separating mechanism according to the states shown in FIGS. 10(*c*), 10(*b*) and 10(*a*) in this order. Next the lock ON/OFF mechanism is driven and the front base 12 and the back base 11 are put in an engaged state. In addition, the moving plate 8 is pulled off from the back base 11 by pulling back the moving plate 8 once again to the support column 61 side. As shown in FIG. 9, at this time, the moving plate 8 can be easily pulled off from the back base 11 by pulling off the upper portion of the moving plate 8 first.

Next, the cassette 1, the reading of which has been finished is ejected from the apparatus. First, the width adjusting motor is driven and the width adjustment by the pushing portion 41 is released. Next, the shutter unit 26 is driven to open by driving of the shutter motor 27. The shutter motor 27 stops when it is detected that the shutter unit 26 is completely open.

When the shutter unit 26 is completely open, the elevating motor 33 is driven and the platform 31 is raised to the ejection position of the cassette 1. The elevating motor 33 stops when the platform 31 is raised to the ejection position.

When the user takes the cassette 1, which has been raised to the ejection position, out of the apparatus, the shutter unit 26 is closed by driving of the shutter motor 27. The shutter motor 27 stops when it is detected that the shutter unit 26 is completely closed.

As described above, in the radiation image reading apparatus of the invention, the front base 12 and the back base 11 of the cassette 1 are separated in the apparatus, and the back base 11 is moved perpendicularly to the base surface, and the optical unit 10 performs sub-scanning between the front base 12 and the back base 11 which are separated so as to be parallel, and the stimulable phosphor sheet is subjected to main scanning by the optical unit 10, and therefore the space required for separating the cassette 1 can be utilized also as the space required for scanning, and thus the apparatus is made more compact. As a result, the space (foot print) required for installing the apparatus and the space for inserting and taking out the cassette 1 is minimized and thus can be installed beside a desk and the like.

Further, in the radiation image reading apparatus of the invention, the cassette is inserted into the radiation image reading apparatus from the upper surface with the short sides of the cassette extending vertically and thus the height dimension is minimized. The size of the cassette is stipulated by JIS (Japanese Industrial Standards) and the maximum standard size of a commonly used cassette (JL14 inches×17 inches) is such that the external dimensions are 383.5×459.5 (mm), and when a cassette having this standard size is loaded with 383.5 mm sides vertical, even if a shutter unit, a body bottom plate structure, and a vibration absorption structure which are commonly used in the reading apparatus are employed, the height dimension of the apparatus (floor surface to the apparatus upper surface) can be about 700 mm or less.

In addition, because the cassette loading inlet is provided on the upper surface of the apparatus, the cassette may be inserted into the upper surface of the apparatus from any directions (such as the width direction or the length direction of the cassette loading inlet 21) and thus a user such as a technician may stand at any positions around the apparatus and perform the cassette insertion operation and the degree of freedom for installation of the apparatus with respect to the operational movement line of the worker is greatly improved and the insertion operation can performed simply and accurately.

In addition, because the cassette 1 that is being read is completely accommodated in the apparatus, and the cassette 1 is ejected from the cassette loading inlet 21 after being read, the user may determine whether the processing for the loaded cassette 1 is complete based on whether the cassette 1 has been ejected even if the user is in a location that is away from the apparatus.

According to the present invention, because the radiation image reading apparatus is made compact, the degree of freedom for installation is enhanced, and the apparatus may be installed beside the desk of a medical practitioner or a technician for example. Further, the user need not lift up the cassette against gravity, and cassette is easily inserted into the apparatus and the reading operation is performed.

What is claimed is:

1. A reading method of radiation image information recorded in a cassette comprising a back base attached with a stimulable phosphor sheet and a front base covering the stimulable phosphor sheet such that the back base and the front base are combined with each other, and also are separated from each other, the reading method comprising steps of:
    inserting the cassette in an upright position through a upper surface of a radiation image reading apparatus;
    loading the inserted cassette into the apparatus;
    separating the front base and the back base of the cassette by disengaging the both bases in the apparatus after the loading step;
    reading the radiation image information from the stimulable phosphor sheet by moving a scanning device between the front base and the back base separated in the separating step;
    combining the front base and the back base after the reading step; and
    ejecting the combined cassette from the upper surface of the apparatus.

2. The reading method of claim 1,
    wherein in the separating step, at least one of the front base and the back base is moved in a thickness direction of the cassette so as to separate the both bases with the bases maintaining approximately parallel to each other.

3. The reading method of claim 1,
    wherein in the inserting step, the cassette is inserted through an upper surface of the apparatus with the short sides of the cassette in an upright position.

4. The reading method of claim 1,
    wherein the stimulate phosphor sheet has a stimulable phosphor layer formed as a columnar crystal by a vapor phase growth method.

5. A radiation image reading apparatus which reads radiation image information from a cassette comprising a back base attached with a stimulable phosphor sheet and a front base covering the stimulable phosphor sheet such that the back base and the front base are combined with each other, and also are separated from each other, the radiation image reading apparatus comprising:
    an insertion opening provided on an upper surface of a housing of the apparatus for inserting the cassette into the apparatus;
    a moving mechanism for moving the inserted cassette to an interior of the apparatus;
    a holding mechanism for holding the cassette in the interior of the apparatus;
    a separating mechanism for separating the front base and the back base of the held cassette; and
    a scanning device for reading the radiation image information from the stimulable phosphor sheet on the separated back base while moving between the front base and the back base separated approximately parallel to each other.

6. The apparatus of claim 5,
    wherein the holding mechanism comprises
    a front base holding device for holding the front base, and
    a back base holding device for holding the back base; and
    wherein the separating mechanism comprises
    a switching device for switching the state of the front base and the back base between a combined state and a separated state; and
    a conveying device for conveying at least one of the holding devices between a combining position and a reading position of the cassette so as to separate the front base and the back base with the both bases maintaining approximately parallel to each other.

7. The apparatus of claim 5,
    wherein the scanning device includes an erasing section for irradiating erasing light, releasing radiation energy remaining in the stimulable phosphor sheet, and
    wherein the scanning device reads the radiation image information while moving in one direction between the front base and the back base and irradiates erasing light on the stimulable phosphor sheet from the erasing section while moving in an opposite direction.

8. The apparatus of claim 5,
    wherein a reading section of the scanning device includes a CCD.

9. The apparatus of claim 5,
    wherein the housing of the apparatus has an inspection door which can be opened and closed on an end in a direction perpendicular to a moving direction of the front base holding device or the back base holding device.

* * * * *